(12) United States Patent
Junkers

(10) Patent No.: US 7,641,579 B2
(45) Date of Patent: Jan. 5, 2010

(54) ECCENTRIC GEAR MECHANISM AND METHOD OF TRANSFERING TURNING FORCE THEREBY

(76) Inventor: John K. Junkers, 14 Algonquin Trail, Saddle River, NJ (US) 07458

(*) Notice: Subject to any disclaimer, the term of this patent is extended or adjusted under 35 U.S.C. 154(b) by 264 days.

(21) Appl. No.: 11/737,470

(22) Filed: Apr. 19, 2007

(65) Prior Publication Data

US 2008/0261743 A1 Oct. 23, 2008

(51) Int. Cl.
*F16H 1/32* (2006.01)
(52) U.S. Cl. ....................................... 475/178
(58) Field of Classification Search ........... 475/162, 475/178, 179
See application file for complete search history.

(56) References Cited

U.S. PATENT DOCUMENTS

| | | | |
|---|---|---|---|
| 1,767,866 A | 6/1930 | Wildhaber | |
| 3,013,447 A | 12/1961 | Hils et al. | |
| 4,841,810 A * | 6/1989 | Lew | 475/165 |
| 5,544,539 A | 8/1996 | Spridco et al. | |
| 6,342,023 B1 | 1/2002 | Willmot | |
| 2005/0119085 A1 | 6/2005 | Becker et al. | |

FOREIGN PATENT DOCUMENTS

| | | |
|---|---|---|
| CH | 36542 | 1/1907 |
| DE | 6947598 | 11/1970 |
| DE | 100 47 934 | 4/2001 |
| DE | 697 31 235 | 10/2005 |
| EP | 0 444 790 | 9/1991 |
| GB | 169396 | 9/1921 |
| GB | 265877 | 2/1927 |
| GB | 1 265 557 | 3/1972 |
| GB | 1 440 242 | 6/1976 |
| GB | 2 315 825 | 2/1998 |
| SU | 171713 | 5/1965 |
| WO | 88/05877 | 8/1988 |

* cited by examiner

*Primary Examiner*—Sherry L Estremsky
*Assistant Examiner*—Edwin A. Young
(74) *Attorney, Agent, or Firm*—Michael J. Striker

(57) ABSTRACT

An eccentric gear mechanism, comprising an input drive having a centric portion rotated about an axis and an eccentric portion; a movable inner ring gear having outer circumferential gear teeth, so that said centric portion and said eccentric portion of said input drive turn in one direction against said movable inner ring gear, said inner ring gear being configured in such a way that it allows an eccentric movement by said inner ring gear and transfers a given turning force derived by said inner ring gear in an opposite direction to said one direction; an outer ring gear having inner circumferential gear teeth partially engaged with said outer circumferential gear teeth of said inner ring gear, so that when said given turning force is derived by said inner gear ring in said opposite direction said outer ring gear rotates around said axis, and said outer ring gear transfers said given turning force in said one direction outwardly along said axis.

8 Claims, 5 Drawing Sheets

ECCENTRIC GEAR MECHANISM AND METHOD OF TRANSFERING TURNING FORCE THEREBY

BACKGROUND OF THE INVENTION

The present invention relates to eccentric gear mechanisms, and methods of transferring turning forces thereby.

Eccentric gear mechanisms are known in the art. An eccentric gear mechanism is known which includes an inner ring gear with outer gear teeth provided on its outer circumference, an outer ring gear with inner gear teeth provided on its inner circumference and engaging with the outer gear teeth of the inner ring gear, and means for generating an eccentric movement between the gears.

The known eccentric gear mechanisms usually have some disadvantages. In particular, they create unwanted vibrations at high speed. The known eccentric gear mechanism turns an inner ring gear, which moves against the outer, centrally located ring gear, so that the outer ring gear turns in the same direction as the eccentric sun drive and the inner ring gear in the opposite direction unlike planet gears. This means that action and reaction are reversed. While this is not a problem with a tool having just a single eccentric gear mechanism as the direction of the input drive can be switched, it is a problem when two or more eccentric gear mechanisms are placed on top of each other or one eccentric gear mechanism is placed on top of planetary gear stages to obtain a high ratio, because unlike the planetary gear mechanism, the eccentric gear mechanism can not use in its outer, centrally located ring gear as the reaction absorbing part, because it would decrease the total ratio by the ratio of the eccentric gear mechanism. It is known that sliding motion is roughly ten times higher than turning friction, and if anything moving eccentric needs to transmit a central force until now the sliding motion was required in the existing eccentric gear mechanisms.

It is therefore believed that the existing gear mechanisms can be further improved.

SUMMARY OF THE INVENTION

Accordingly, it is an object of the present invention to provide an eccentric gear mechanism, which is an improvement of the existing gear mechanisms.

More particularly, it is an object of the present invention to provide a new, eccentric gear mechanism which has a very high gear ratio in a relatively small space.

In keeping with these objects and with others which will become apparent hereinafter, one feature of the present invention resides, briefly stated, in an eccentric gear mechanism, comprising an input drive having a centric portion rotated about an axis and an eccentric portion; a movable inner ring gear having outer circumferential gear teeth, so that said centric portion and said eccentric portion of said input drive turn in one direction against said movable inner ring gear, said inner ring gear being configured in such a way that it allows an eccentric movement by said inner ring gear and transfers a given turning force derived by said inner ring gear in an opposite direction to said one direction; an outer ring gear having inner circumferential gear teeth partially engaged with said outer circumferential gear teeth of said inner ring gear, so that when said given turning force is derived by said inner gear ring in said opposite direction said outer ring gear rotates around said axis, and said outer ring gear transfers said given turning force in said one direction outwardly along said axis.

Another feature of the present invention resides, briefly stated in a method of transferring a turning force by an external gear mechanism, comprising the steps of providing an input drive having a centric portion with an axis and an eccentric portion; rotating said centric portion and thereby said input drive about said axis; providing a movable inner ring gear having outer circumferential gear teeth; turning said centric portion and said eccentric portion of said input drive turn in one direction against said movable inner ring gear; forming said inner ring gear in such a way that it allows an eccentric movement by said inner ring gear and transfers a given turning force derived by said inner ring gear in a opposite direction to said one direction; providing an outer ring gear having inner circumferential gear teeth; partially engaging said inner circumferential gear teeth of said outer ring gear with said outer circumferential gear teeth of said inner ring gear, so that when said given turning force is derived by said inner gear ring in said opposite direction said outer ring gear rotates around said axis, and said outer ring gear transfers said given turning force in said one direction outwardly along said axis.

The eccentric gear mechanism in accordance with the present invention has from the outside-in, the centrally located outer ring gear with the gear teeth on its inner circumference, the inner ring gear with its gear teeth on its outer circumference movable relative to the gear teeth on the inner circumference of the outer ring gear when pushed against the ring gear by the centrally located eccentric drive.

Therefore, when the centrally located eccentric drive turns clockwise, the inner ring gear receives a counterclockwise turning force when turning in the gear teeth of the centrally located outer ring gear, while the outer ring gear receives a clockwise turning force. This in turn means that if the direction of the turning of the centrally located eccentric drive is to be upheld when more than one stage is applied, the outer ring gear becomes the drive gear and the inner ring gear becomes the reaction gear. This in turn means that the eccentric motion of the inner ring gear needs to be transferred from a sliding motion into a rotating motion to increase its efficiency as it has otherwise no major advantage.

This can be achieved by providing a housing part, which can be formed for example as a lid. For this purpose the inventive eccentric gear mechanism has connecting means for connecting said inner ring gear with said housing and including one opening provided for receiving said input drive, and another opening which is spaced from said one opening and receives a pin with a bearing in a way that allows said eccentric movement of said inner ring gear without allowing said inner ring gear to turn while allowing said bearing to rotate in said another opening.

In accordance with one embodiment of the present invention, said another opening is provided in said housing part, while said pin with said bearing is arranged in said inner ring gear. In accordance with another embodiment of the present invention, said another opening is provided in said inner ring gear, while said pin with the bearing is provided in said housing part.

It is to be understood that these are only two ways of transferring the reaction force created by the inner ring gear onto the housing without the sliding motion. Other ways are also possible without departing from the spirit of the present invention.

In order to avoid vibrations when the tool provided with the inventive eccentric gear mechanism is powered by a high speed motor, the centrally located eccentric drive can be weight-balanced to assure that the eccentric drive during its turning motion is balanced to the point that the usual vibrations are eliminated.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
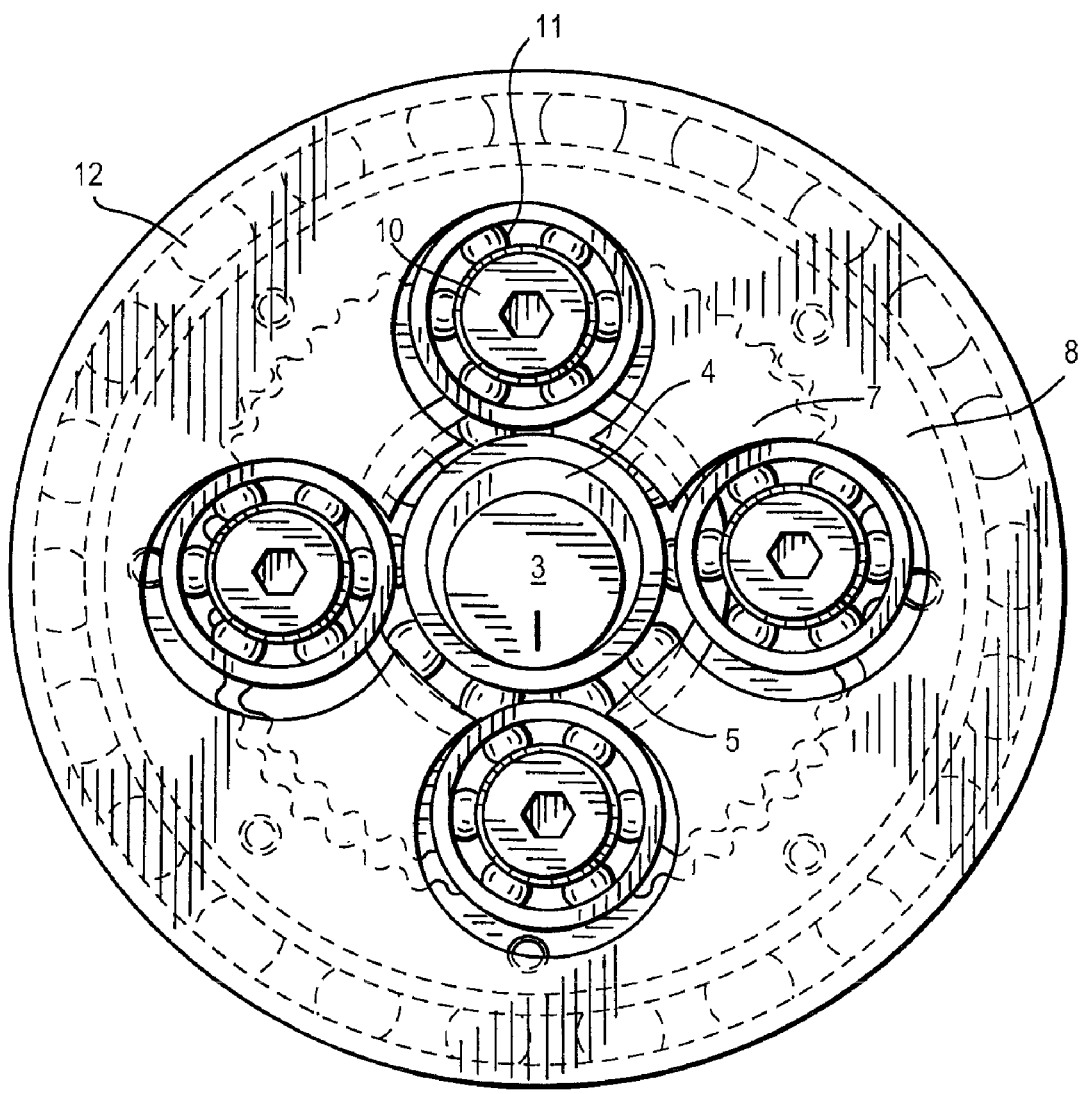
FIG. 1 is an axial end view of an eccentric gear mechanism in accordance with the present invention, in different positions of its parts during the operation of the mechanism.
Figure 2:
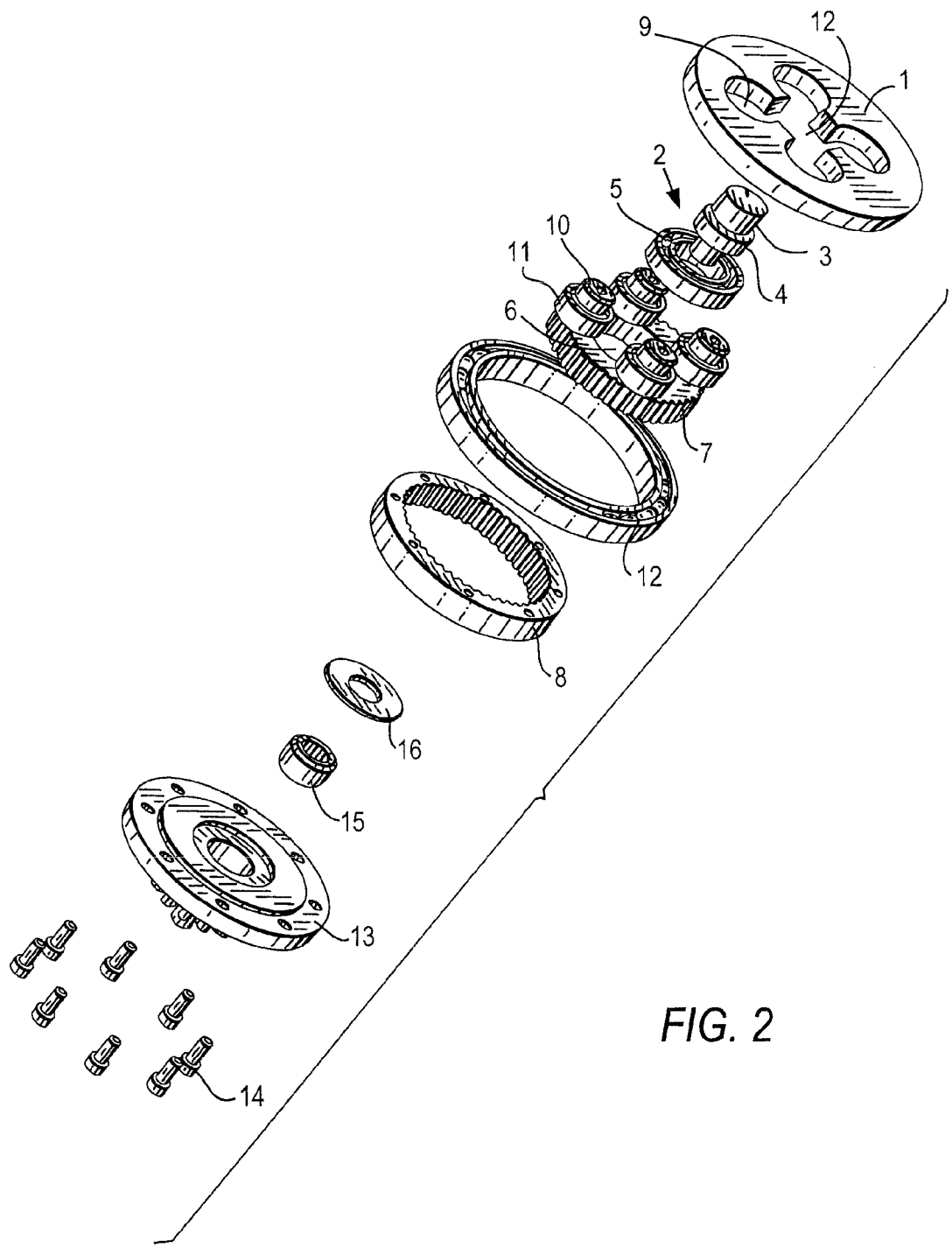
FIG. 2 is an exploded view of the inventive eccentric gear mechanism, showing its individual parts.
Figure 3:
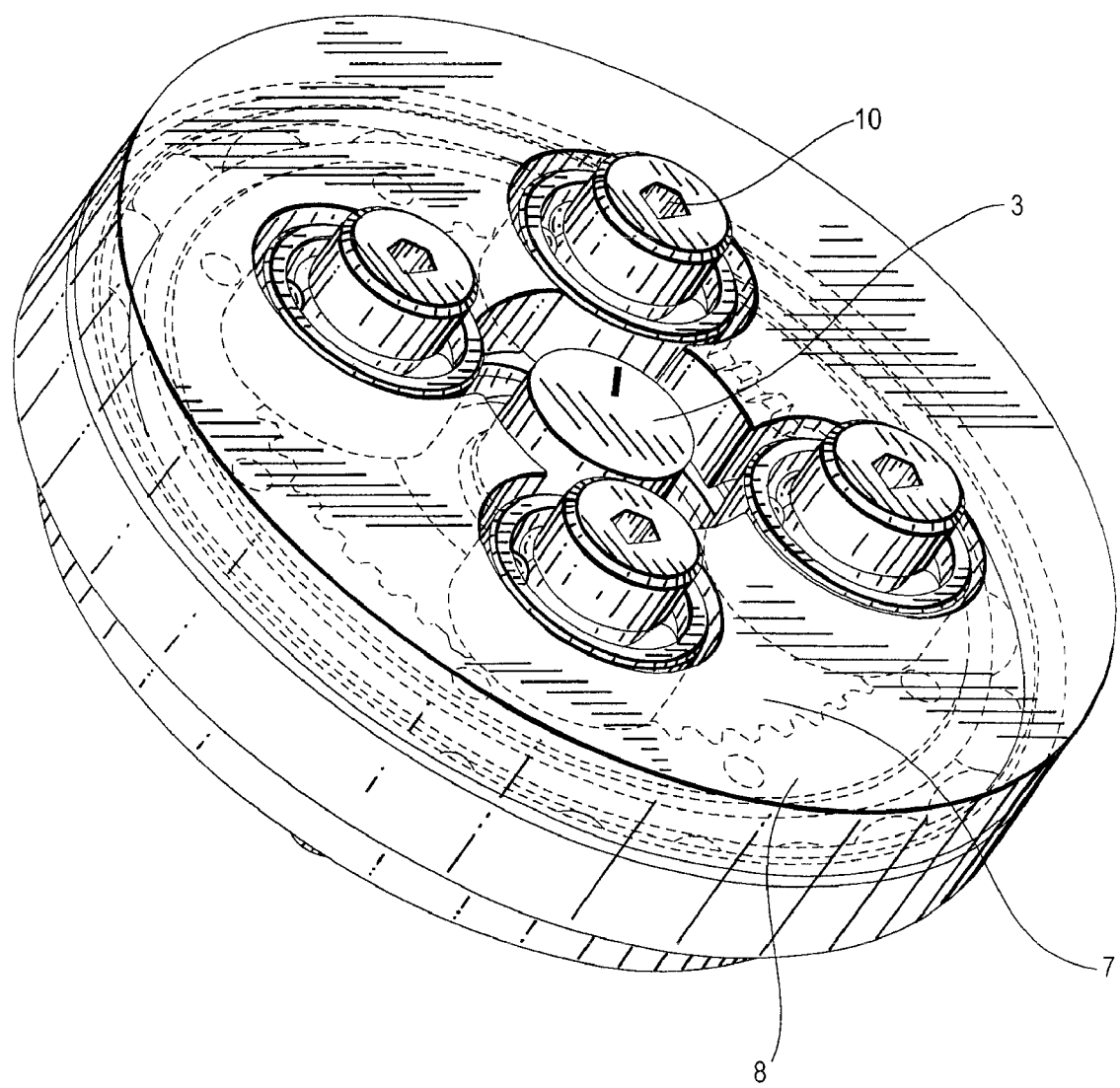
FIGS. 3 and 4 show two opposite perspective views of the inventive eccentric gear mechanism.
Figure 4:
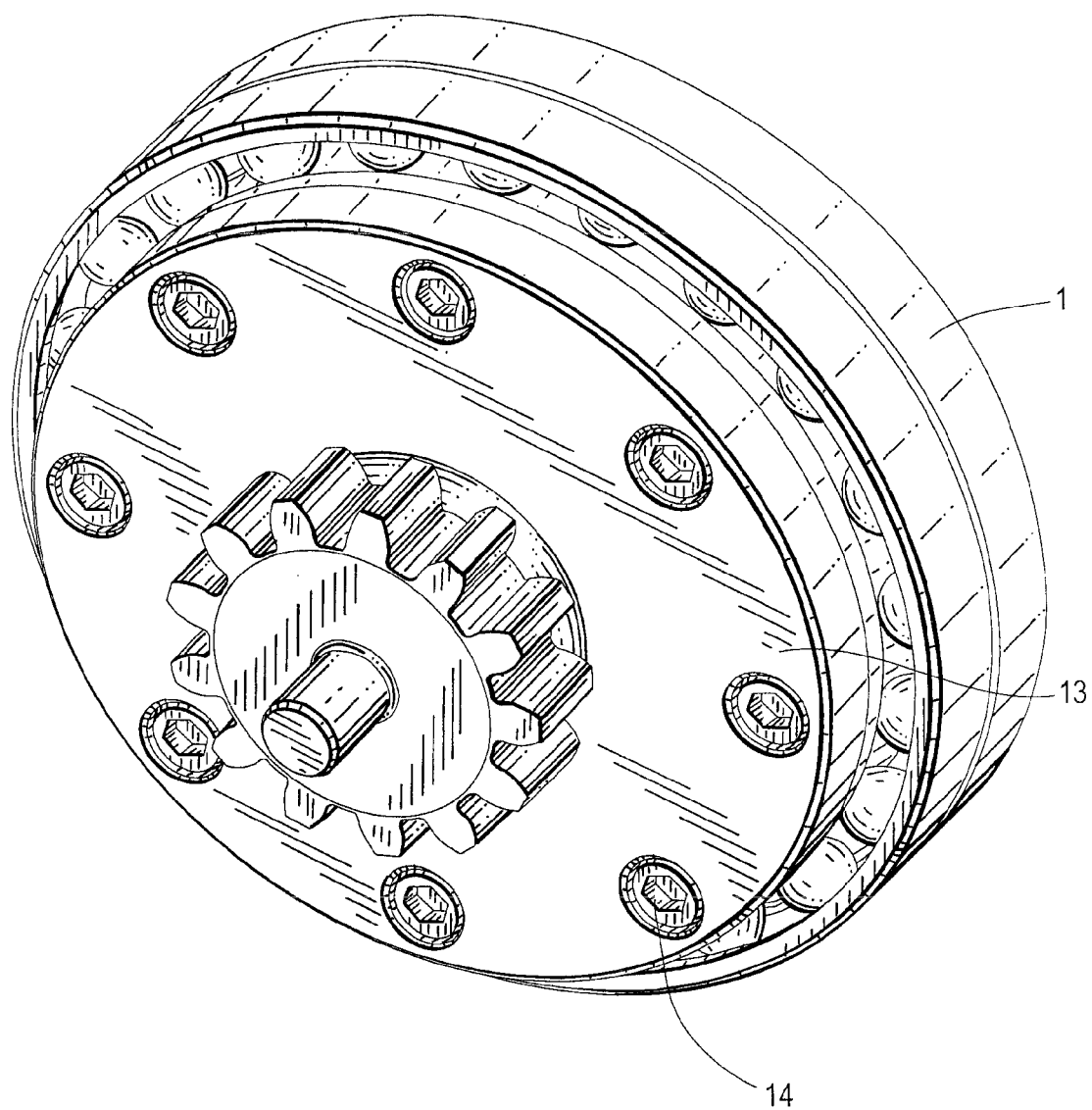
Figure 5:
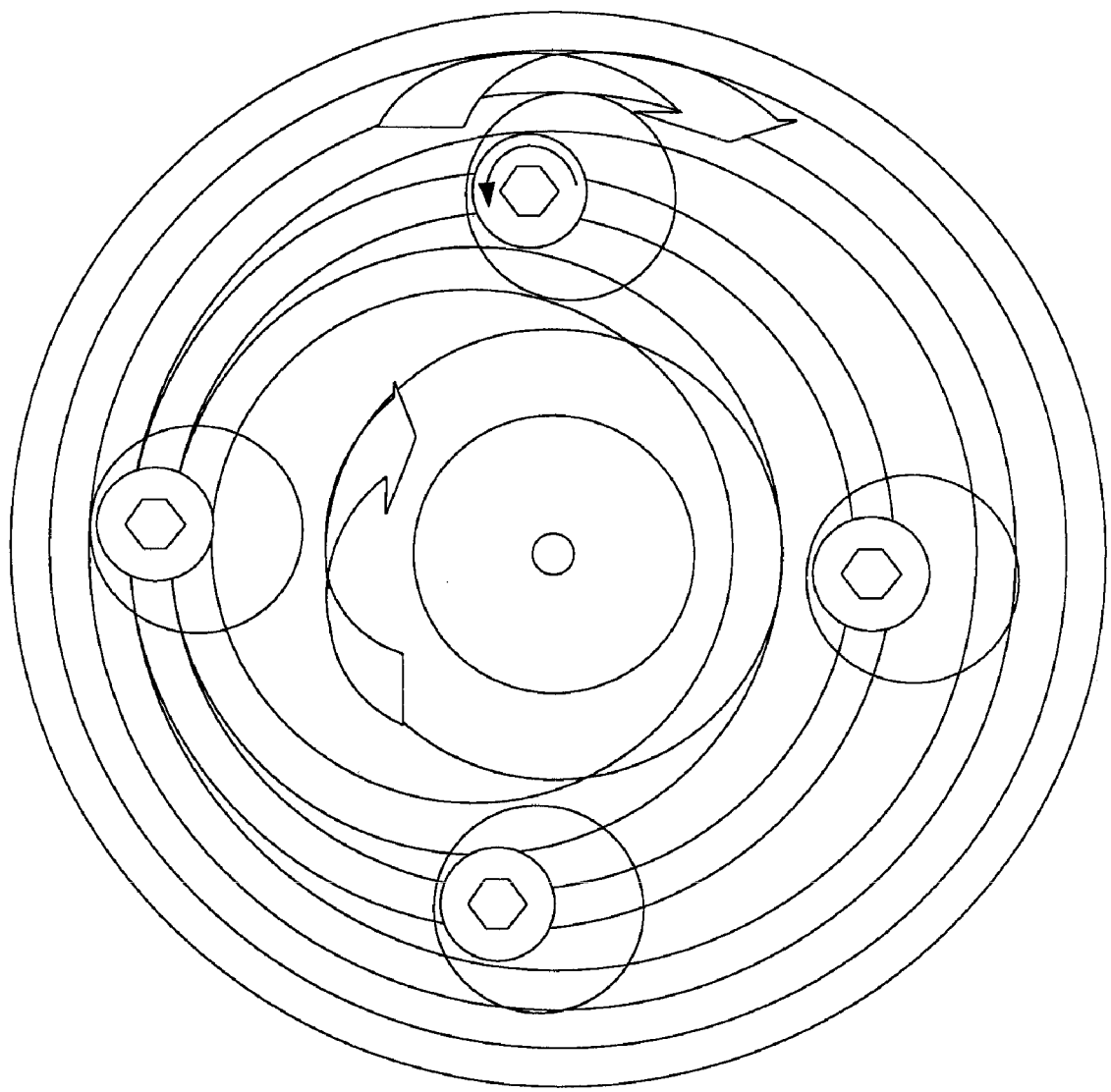
FIG. 5 schematically shows the motions of the parts of the inventive eccentric gear mechanism.

An eccentric gear mechanism in accordance with the present invention has an immovable, non-rotatable housing 1 which can be formed for example as a lid, or as a housing to which the stationary lid is immovably, non-rotatably connected.

The inventive eccentric gear mechanism further has an input drive which is identified as a whole with reference numeral 2. The input drive has a centric portion which forms an input shaft 3 and is rotated from outside around an axis A. The input drive 2 has an eccentric portion, formed for example as an eccentric cam 4.

The eccentric cam 4 is provided with a bearing 5. It is insertable with the bearing 5 into an inner opening 6 of an inner ring gear 7. The inner ring gear 7 has outer gear teeth provided on its outer circumference.

The eccentric gear mechanism further has an outer ring gear 8 provided with inner gear teeth on its inner circumference. The outer gear teeth of the inner ring gear 7 engage partially with the inner gear teeth of the outer ring gear 8.

Means are provided for connecting the inner ring gear 7 to the housing part 1 formed for example as a lid. The connecting means include for example at least one opening 9 provided in the housing part 1 and at least one pin 10 provided on the inner ring gear 7 and having a bearing 11 inserted into the opening 9 with a gap between an outer diameter of the bearing 11 and a diameter of the opening 9. As can be seen from the drawings, several openings 9 can be provided in the housing part 1, and several bearings 11 with the pins 10 can be inserted in them. The housing part 1 is also provided with an opening 12 in which the input shaft 3 is rotatably inserted.

It is to be understood that the connecting means can be designed differently. For example, the openings 9 can be provided in the inner ring gear 7, while the pins 10 can be provided in the housing part 1. Also, other variants are possible as well.

The outer ring gear 8 of the eccentric gear mechanism has more teeth than the inner ring gear 7. For example, the outer ring gear 8 can have two more teeth than the inner ring gear 6.

The outer ring gear 8 is arranged in a bearing 12 and connected to a sun gear 13, or can be made as of one piece with the latter. The connection can be carried out by screws 14. The opposite end of the input shaft 3 can be supported for example in a needle bearing 15. A washer 16 can be arranged on the sun gear 13.

When the input shaft 3 is rotated from outside around the axis A, the inner ring gear 7 can not rotate and instead the inner ring gear performs a gyration motion. The gyration of the inner ring gear 7 causes a rotation of the outer ring gear 8 around the axis A in the same direction as the input shaft 3, and the outer ring gear 8 transfers the turning force along the axis A outwardly.

The thusly designed eccentric gear mechanism has a very high gear ratio to provide a much bigger speed reduction and a torque multiplication, and it is much more compact.

It will be understood that each of the elements described above, or two or more together, may also find a useful application in other types of constructions differing from the types described above.

While the invention has been illustrated and described as embodied in an eccentric gear mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims:

The invention claimed is:

1. An eccentric gear mechanism, comprising an input drive having a centric portion rotated about an axis and an eccentric portion; a movable inner ring gear having outer circumferential gear teeth and an outer ring gear having inner circumferential teeth partially engaged with said outer circumferential gear teeth of said inner ring gear, so that when said centric portion and said eccentric portion of said input drive turn in one direction against said movable inner ring gear to apply a turning force to said movable inner ring gear in an opposite direction, said inner ring gear moves against said outer ring gear and applies a turning force to said outer ring gear in said one direction and transfers said given turning force applied on said outer ring gear outwardly, wherein said outer ring gear only circumferentially surrounds said inner ring gear and has an axial dimension which corresponds to an axial dimension of said inner ring gear so that said outer ring gear does not extend axially outwardly beyond said inner ring gear.

2. The eccentric gear mechanism as defined in claim 1, and further comprising a housing with connecting means for connecting said inner ring gear with said housing in a way that said connecting means permit an eccentric movement of said inner ring gear without allowing said inner gear ring to turn and said housing is non-rotatable so that the turning force on said outer ring gear is transferred outwardly.

3. The eccentric gear mechanism as defined in claim 2, wherein said connecting means connect said inner gear ring with said housing in a way that said connecting means permits said eccentric movement of said inner ring gear without a sliding motion of said connecting means and without turning of said inner ring gear around said axis.

4. The eccentric gear mechanism as defined in claim 2, wherein said connecting means connect said inner gear ring with said housing and include one opening provided for receiving said input drive, and at least another opening which is spaced from said one opening and receives a pin in a way that allows said eccentric movement of said inner gear ring without allowing said inner gear ring to turn around said axis while allowing said pin to move in said at least another opening.

5. The eccentric gear mechanism as defined in claim 4, wherein said another opening is provided in said housing, while said pin is arranged in said inner gear ring.

6. The eccentric gear mechanism as defined in claim 4, wherein said housing has a housing part formed as a lid.

7. The eccentric gear mechanism as defined in claim 1, wherein said eccentric portion of said input drive is weight-balanced.

8. A method of transferring a turning force by an eccentric gear mechanism, comprising the steps of providing an input drive having a centric portion with an axis and an eccentric portion; rotating said centric portion about said axis; providing a movable inner ring gear having outer circumferential gear teeth and an outer ring gear having inner circumferential teeth; partially engaging said inner circumferential teeth of the outer ring gear with said outer circumferential gear teeth of said inner ring gear, so that when said centric portion and said eccentric portion of said input drive turn in one direction against said movable inner ring gear to apply a turning force to said movable inner ring gear in an opposite direction, said inner ring gear moves against said outer ring gear and applies a turning force to said outer ring gear in said one direction and transfers said given turning force applied on said outer ring gear outwardly; only circumferentially surrounding said inner ring gear with said outer ring gear; and providing an axial dimension of said outer ring gear which corresponds to an axial dimension of said inner ring gear so that said outer ring gear does not extend axially outwardly beyond said inner ring gear.

* * * * *